(12) United States Patent
Brian et al.

(10) Patent No.: US 8,930,037 B2
(45) Date of Patent: Jan. 6, 2015

(54) ENERGY MANAGER WITH MINIMUM USE ENERGY PROFILE

(75) Inventors: Joseph Mark Brian, Louisville, KY (US); Michael Thomas Beyerle, Pewee Valley, KY (US); Jay Andrew Broniak, Louisville, KY (US); David C. Bingham, Louisville, KY (US)

(73) Assignee: General Electric Company, Schenectady, NY (US)

( * ) Notice: Subject to any disclaimer, the term of this patent is extended or adjusted under 35 U.S.C. 154(b) by 347 days.

(21) Appl. No.: 12/896,194

(22) Filed: Oct. 1, 2010

(65) Prior Publication Data

US 2012/0065796 A1    Mar. 15, 2012

(51) Int. Cl.
| | |
|---|---|
| G06F 1/32 | (2006.01) |
| H02J 3/14 | (2006.01) |
| G05B 15/02 | (2006.01) |
| G06Q 30/02 | (2012.01) |
| G06Q 50/06 | (2012.01) |

(52) U.S. Cl.
CPC . H02J 3/14 (2013.01); G05B 15/02 (2013.01); G06Q 30/0206 (2013.01); G06Q 30/0283 (2013.01); Y02B 10/30 (2013.01); Y02B 70/3225 (2013.01); Y02B 70/3275 (2013.01); Y04S 20/222 (2013.01); Y04S 20/244 (2013.01); G06Q 50/06 (2013.01); Y04S 10/545 (2013.01); Y04S 50/14 (2013.01); Y02E 40/76 (2013.01)

USPC ........... 700/295; 700/276; 700/291; 700/297; 705/412; 715/738

(58) Field of Classification Search
CPC ........................................................ G06F 1/32
USPC .................. 700/295, 276, 291, 297; 705/412; 715/738
See application file for complete search history.

(56) References Cited

U.S. PATENT DOCUMENTS

| | | | |
|---|---|---|---|
| 2008/0091625 A1* | 4/2008 | Kremen ........................ | 705/412 |
| 2008/0272934 A1* | 11/2008 | Wang et al. .............. | 340/870.11 |
| 2010/0070091 A1* | 3/2010 | Watson et al. ................ | 700/278 |
| 2010/0218108 A1* | 8/2010 | Crabtree et al. .............. | 715/738 |
| 2012/0016528 A1* | 1/2012 | Raman et al. ................. | 700/291 |

* cited by examiner

*Primary Examiner* — Tejal Gami
(74) *Attorney, Agent, or Firm* — GE Global Patent Operation; Marc A. Vivenzio

(57) ABSTRACT

A system and method for maximizing the value of power generated by a residential power generator. A home energy manager device is configured to implement a minimum energy usage profile during a peak demand event such that a maximum amount of power generated by the consumer can be sold back to the utility. For renewable energy sources such as solar cells, peak demand events often correspond with peak output of the renewable energy source. For example, hot sunny summer days are conducive to maximum solar power output and, typically, also result in maximum power demand for powering air conditioners.

15 Claims, 2 Drawing Sheets

ENERGY MANAGER WITH MINIMUM USE ENERGY PROFILE

BACKGROUND OF THE DISCLOSURE

The present disclosure relates to energy management, and more particularly to power consuming device control methods and electrical energy consumption systems.

Home energy management (HEM) systems are becoming a key to reducing energy consumption in homes and buildings, in a consumer friendly manner. Existing HEMs are commonly in the form of a special custom configured computer with an integrated display, which communicates to devices in the home and stores data, and also has simple algorithms to enable energy reduction. This type of device may also include a keypad for data entry or the display may be a touch screen. In either arrangement, the display, computer and key pad (if used) are formed as a single unit. This single unit is either integrated in a unitary housing, or if the display is not in the same housing, the display and computer are otherwise connected/associated upon delivery from the factory and/or synchronized or tuned to work as a single unit.

Key functions of a HEM include:
Creates a network of energy consuming devices within the home,
Measures the consumption of the whole home/building or individual devices,
Records and stores energy consumption information in a database, and
Enables consumer interface with all energy consuming devices in a home to:
view consumption data of individual devices
set preferences for operation of energy consuming devices at different times during the day or at different energy pricing levels
control/program energy consuming devices.

In some installations, an auxiliary power generating source, such as a gas generator, solar cell array, wind turbine, etc., or combination thereof, is provided to supply power to the appliances and other energy consuming devices during interruptions in utility power, or to provide supplemental power to reduce electric utility costs. In some cases, power generated by such consumer (residential) power generators is sold back to the electric utility.

SUMMARY OF THE DISCLOSURE

To maximize the value of power generated by the consumer, the HEM can be configured to implement a minimum energy usage profile during a peak demand event such that a maximum amount of power generated by the consumer can be sold back to the utility. For renewable energy sources such as solar cells, peak demand events often correspond with peak output of the renewable energy source. For example, hot sunny summer days are conducive to maximum solar power output and, typically, also result in maximum power demand for powering air conditioners. This present the opportunity to maximize value by reducing energy consumption during such times.

Accordingly, a home energy management system comprises at least one energy consuming device, at least one residential power generator, and a home energy manager in communication with said at least one energy consuming device and said at least one residential power generator, the home energy manager device adapted to control the at least one energy consuming device in accordance with an energy use profile. The home energy manager is configured to detect a peak demand condition corresponding to increased energy rates, and in response thereto, compare a power output total of the at least one residential power generator to a power rating of predetermined minimum energy use profile and, if the power output exceeds the power rating of the minimum energy use profile, the controller activates the minimum energy use profile. During periods of peak demand, excess power generated by the at least one residential power generator can be sold at the increased rate.

The home energy manager can be adapted to receive a signal from a power utility supplying power to the at least one energy consuming device, the signal indicative of a peak demand condition corresponding to increased energy rates charged by the utility. The management system can further include a user input device for enabling a user to customize the minimum energy use profile. The at least one energy consuming device can include at least one appliance. The at least one appliance can include at least one of a hot water heater, HVAC unit, refrigerator, washer, dryer, heater, dishwasher, microwave, pool pump, or 120V/240V plug loads. The home energy manager can be configured to disable the at least one energy consuming device when the minimum energy use profile is implemented. The home energy manager can be configured to switch the at least one energy consuming device to a low power mode when the low energy profile is implemented. The at least one residential power generator can include at least one of a gas generator, a solar photovoltaic array, a wind turbine, a hydroelectric power generator, or a battery powered inverter.

In accordance with another aspect, a home energy management device comprises a controller for controlling at least one energy consuming device in accordance with an energy use profile, said controller in communication with at least one residential power generator and adapted to receive power output information from said at least one generator, and a communication interface for receiving a signal indicative of a peak demand condition corresponding to increased energy rates. When the signal indicative of a peak demand condition is received, the controller compares a power output total of the at least one generator to a predetermined minimum energy use profile and, if the power output exceeds a power rating of the minimum energy use profile, the controller activates the minimum energy use profile. During periods of peak energy demand, excess power generated by the at least one renewable power generator can be sold at the increased rate.

The home energy management device can further include a user input device for enabling a user to customize the minimum energy use profile. The at least one energy consuming device that the controller is configured to control can include at least one appliance. The at least one appliance can include at least one hot water heater, HVAC unit, refrigerator, washer, dryer, heater, dishwasher, microwave, pool pump, or 120V/240V plug loads. The controller can be configured to disable the at least one energy consuming device when the minimum energy use profile is implemented. The controller can be configured to switch the at least one energy consuming device to a low power mode when the minimum energy use profile is implemented. The at least one residential power generator can include at least one of a gas generator, a solar photovoltaic array, a wind turbine, a hydroelectric power generator, or a battery powered inverter.

In accordance with another aspect, a method of maximizing the value of power generated by a residential energy power generator connected to a home energy manager of a home energy management system, the home energy manager configured to control at least one energy consuming device in accordance with an energy use profile, the method comprising the steps of detecting a peak energy demand condition corresponding to increased energy rates, comparing an output of the residential power generator to a power rating of a minimum energy use profile, and activating the minimum energy use profile if the power output of the generator exceeds the power rating of the minimum energy use profile.

The step of activating the minimum energy use profile can include switching off at least one non-essential energy consuming device. The step of activating the minimum energy use profile can include switching at least one energy consuming device to a low energy mode. The step of detecting a peak energy demand can include receiving a signal indicative of a peak energy demand condition from a power utility. The method can further include the step of, after activating the minimum energy use profile, deactivating the minimum energy use profile upon the occurrence of a deactivating event including expiration of a prescribed period of time, when the power output of the generator decreases below the power rating of the minimum energy use profile for a prescribed period of time, restoration of utility power, or manual deactivation by a consumer.

DETAILED DESCRIPTION OF THE PREFERRED EMBODIMENTS

Figure 1:
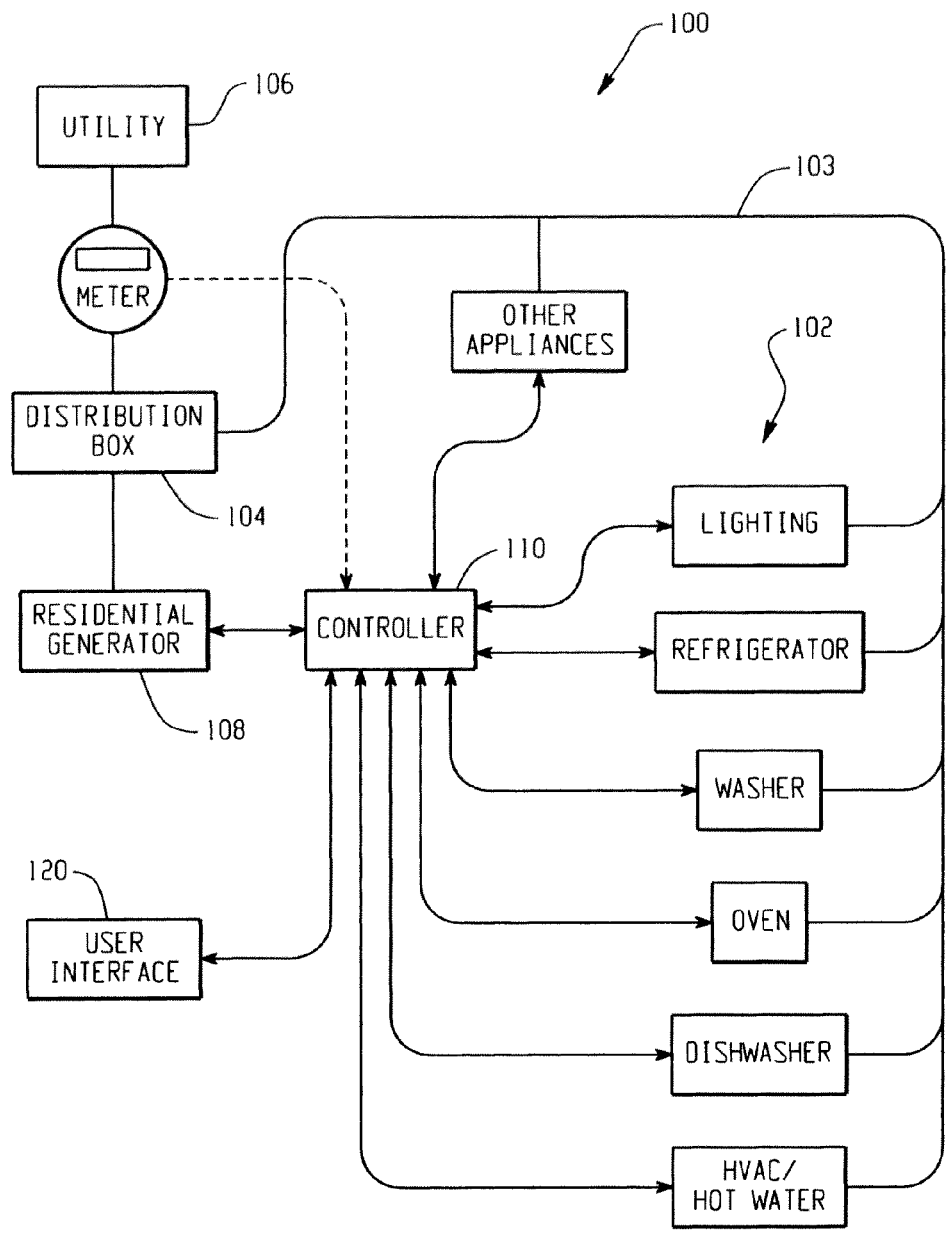
FIG. 1 is a schematic illustration of a household energy management system according to the present disclosure.

It should, of course, be understood that the description and drawings herein are merely illustrative and that various modifications and changes can be made in the structures disclosed without departing from the present disclosure. Referring now to the drawings, FIG. 1 schematically illustrates a household energy management system 100 for one or more energy consuming devices 102. The term energy consuming devices is used herein to include any electrical loads such as appliances, including typical household appliances such as a refrigerator, dishwasher, washer, dryer, microwave and oven, as well as an HVAC system, water heater, lighting, pool pump, plug load, etc. Although only appliances are illustrated in FIG. 1, it will be appreciated that switched outlets and other household loads are included within the meaning of energy consuming devices.

Each energy consuming device 102 is connected to a circuit 103 delivering electricity thereto from a power distribution box 104 (e.g., circuit breaker panel). The power distribution box 104 typically receives electrical power from a power utility 106. A residential generator 108 is connected to the power distribution box 104 and is configured to supply supplementary power to the household. The residential generator 108 may be a gas or diesel generator, or any other power generator such as a wind turbine or solar cell array, and/or battery bank, for example.

The energy management system 100 also includes a controller 110, also referred to as a "home energy manager" (HEM), for managing power consumption of the one or more energy consuming devices within the household. The controller 110 can include a micro computer on a printed circuit board which is programmed to selectively control the energization of at least one power consuming feature/function of each appliance, etc. The controller 110 can be in signal communication with the energy utility 106, such as an energy supplying utility or a third party utility aggregator, supplying power to the appliances and other household loads via the one or more circuits 103. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by the energy utility, such as a power company, and can be transmitted via a power line, as a radio frequency signal, or by any other means for transmitting a signal when the utility provider desires to reduce demand for its resources, such as during peak demand events. Each appliance 102 has a communication interface that links itself to the controller 110.

The system 100 further includes a control panel or interface 120, such as a display monitor or touch-screen, operatively connected to the controller 110. The user interface receives energy management input for each energy consuming device or appliance 102 from the user. For example, according to one exemplary embodiment, the controller 110 includes a memory that stores past usage data, present usage data, and can also be programmed to store a selected response or mode of operation for each appliance depending on the data received from the energy utility or when commanded by the user.

Further, each appliance controller can contain the response or mode of operation that will correspond to a minimum use energy profile for that appliance. In such case, the HEM could ask the appliance for its minimum use energy profile information, use that information to make decisions, and then tell the appliance to activate the profile.

The controller 110 includes predefined operating modes or user profiles, such as a peak demand mode, an off-peak demand mode, an away mode, a vacation mode and a survival mode. As noted, these attributes may come from each individual appliance as it registers on the network, and the HEM can use this info to make decisions. Each predefined user profile is associated with a predetermined parameter of energy usage for each appliance, such as a maximum energy usage and/or a maximum energy cost for each appliance. Examples of predefined user profiles for several appliances are provided in the table below.

| Appliance | Predefined User Profile |
| --- | --- |
| HVAC | Normal Mode—setpoint temperature per homeowner's settings |
| | Energy Savings Mode—setpoint temperature shifted up/down by "x" degrees |
| Refrigerator | Normal Mode—setpoint temperature per homeowner's settings; all features working |
| | Energy Savings Mode—setpoint temperature shifted up/down by "x" degrees; certain features delayed or disabled such as "quick chill" |
| Hot water heater | Normal Mode—setpoint temperature per homeowner's settings, typically 130 F. |
| | Energy Savings Mode, Level 1—setpoint temperature shifted to 120 F. |
| | Energy Savings Mode, Level 2—setpoint temperature shifted to 100 F. |

It should be appreciated that the controller 110 can be configured with default settings which govern normal mode and energy savings mode operation. Such settings in each mode can be fixed while others adjustable to provide response to load shedding signals. In addition to the predefined user profiles, the controller 110 is configured to allow the user to create at least one unique user profile via the user interface 120. The unique user profile has a user selected parameter of energy usage for at least one appliance. In use, the user may select one of the predefined user profiles or the unique user profile via the user interface 120 for each appliance. The controller 110 at least one of controls and operates each appliance 102 in one of a plurality of operating modes, including at least a normal operating mode and an energy savings mode, in response to the input received by the user via the user interface in conjunction with the received signal.

By way of example, in a "survival mode" the user may opt to shut loads entirely off. An extreme scenario would be to only run the refrigerator(s) at the highest safe setpoint, and shut down the rest of the house (e.g., no water heater, no pool pump, no AC, etc.) This condition would only be transient for 3 or 4 hours, but could save the homeowner $15 ($10 in generated electricity sold back to the utility, and $5 savings in lowered energy consumption) based on $1.00/kWh electricity rates and 10 kWh of electricity that is sold back to the utility.

According to one exemplary embodiment, to reduce power consumption of each appliance in the energy savings mode (also referred to as a minimum energy usage profile), the controller 110 selectively adjusts and/or disables at least one power consuming feature/function of each appliance. Further details of the home energy management system are set forth in commonly-assigned U.S. patent application Ser. No. 12/644,812 filed on Dec. 22, 2009, which is hereby incorporated herein by reference in its entirety.

The foregoing functions of the home energy management system can be applied in systems having power generation devices, such as a gas or diesel generator, or renewable power generators such as wind turbines, solar cell array, etc. to manage household loads to optimize power generation during periods of peak energy demand and/or periods of peak residential generator output. In this manner, excess power can be sold back to a local utility at a maximum rate.

For example, during various times of the year, environmental conditions may exist such that renewable energy sources hit their peak output. For example, on hot sunny summer days, the output of a solar panel system may hit maximum levels for sustained amounts of time. These peak times may also coincide with energy costs reaching a maximum value. When everybody is using an air conditioner on a hot sunny day in the summer, utilities are likely to implement peak rate tariffs. When high rates and high renewable energy availability occur at the same time that the homeowner is away (work, vacation, etc.), it creates an opportunity to reduce the house energy to some minimum level and sell all excess power back to the utility. The energy management algorithm would automate this task, turning off select loads, and placing appliances into a minimum power consumption mode. For example, the refrigerator setpoint could be temporarily adjusted upward to reduce energy consumption, pool pumps turned off, water heaters turned off, HVAC system set to a higher, but safe set point, plug load switches turned off, any other non-critical load in the home such as lights could be turned off. The user could set up a "minimum energy use" profile in their HEM energy management device where they set priorities and conditions for the algorithm to take effect. This entire system could be leveraged to be in effect during peak energy times, which will be known to the HEM energy management system through connection with the utility via a smart meter, or otherwise.

For example, within the user interface 120 of the system 100 an option screen can be provided for placing the system into a minimum energy use profile. An exemplary low power minimum energy use profile can include, but is not limited to:

Shifting refrigerator and freezer setpoints thus reducing the overall electrical consumption of the appliance while preventing food spoilage.

Running a hybrid water heater having a heat pump and a conventional heating element, such as GE's Hybrid Electric Geo-Spring Water Heater, in heat pump only mode. This low energy consumption mode will provide the homeowner with hot water while slightly impacting recovery time. Other options include adjusting the setpoint of the water heater to a lower level.

Adjusting HVAC thermostat setpoints. The controller 110 can adjust the home's thermostat setpoint to a higher temperature while still keeping the home at a comfortable level. It will also look to suspend/turn off other main loads in order to overcome the high starting current of the blower motor. After this current drops the controller can then re-enable the other loads.

Reducing the max power consumption of an electric range/cooktop. The max power level will be reduced allowing the homeowner to still cook however it would prolong the cooking cycle.

The power rating of the minimum energy usage profile may typically correspond to a maximum power demand allowed by the profile. For example, a minimum energy usage profile can restrict power consumption to 1 kW at any given time. Loads may be switched on and off such that a wide variety of devices can be used, but the total demand will not exceed 1 kW.

Figure 2:
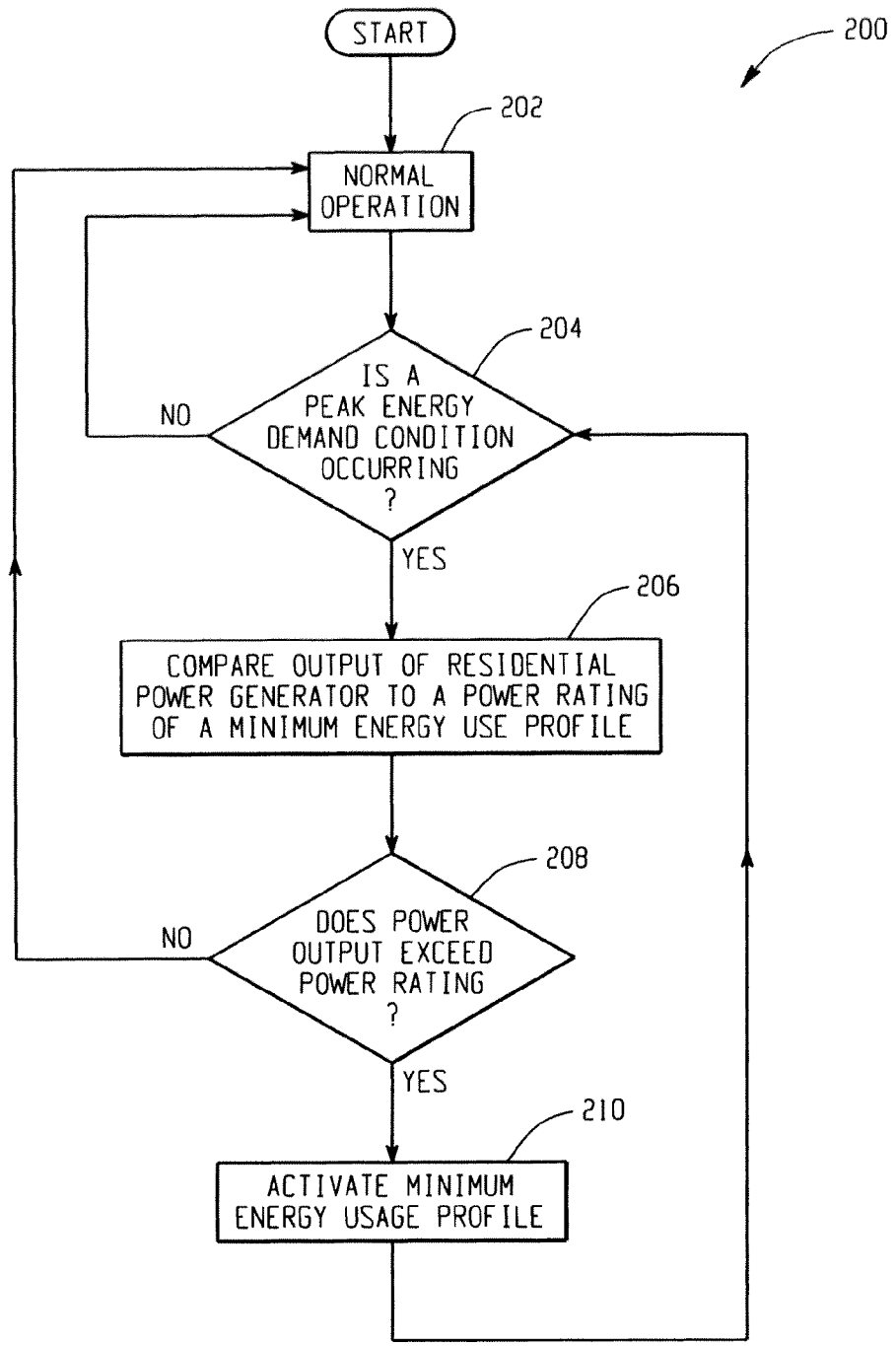
FIG. 2 is an exemplary operational flow chart for the household energy management system of FIG. 1.

Referring now to FIG. 2, a flowchart illustrating an exemplary method in accordance with the present disclosure will be described. The method can be particularly effective for maximizing the value of power generated by a residential power generator connected to a home energy manager of a home energy management system wherein the home energy manager configured to control at least one energy consuming device in accordance with an energy use profile.

The process begins in step 202 wherein the home energy management system is operating in a normal mode. Such normal mode can correspond to typical everyday operation wherein the HEM manages power consuming devices in accordance with a normal operational mode that permits most energy consuming appliance, devices, functions, etc. to operate on demand (e.g., not a minimum energy use profile).

In process step 204, the HEM determines the occurrence of a peak energy demand condition. Such peak energy demand condition may typically correspond to situations when energy demand approaches energy supply, or when demand exceeds a certain value. This can occur on very hot days when energy consumption by air conditioning units increases. A peak energy demand condition can also occur in the event one or more power generating stations falls off-line. The occurrence of such peak demand event can be communicated to the HEM via a signal received from a utility, smart meter, etc.

If a peak energy demand condition is not occurring, then the process reverts back to process step 202, otherwise the process continues to process step 206 where the output of the residential power generator is compared to a power rating of the minimum energy usage profile, such as the profile described above. In process step 208, if the power output does not exceed the power rating of the profile, the process reverts to process step 202 and normal operation continues. If the power output exceeds the power rating of the profile thereby indicating that excess power is available to sell to the local utility, then the process continues to process step 210 and the minimum energy usage profile is activated.

As will be appreciated that any excess power generated by the residential power generator when the minimum energy usage profile is active can be sold back to the local utility at the increased peak rate. Thus, the power generated earns a premium during this time resulting in increased profit for the consumer. After process step 210, the process loops back to process step 204 until the peak energy demand condition ceases to occur and/or the power generated by the generator is less than the power rating of the minimum energy usage profile.

In general, it will be appreciated that a consumer may only wish to implement the minimum energy use profile if a substantial benefit can be realized by doing so, or only when the consumer is absent from the premises. That is, a consumer may not wish to activate the minimum energy use profile if the power rating of the profile exceeds to power available from the residential generator, since doing so can subject the consumer to potential inconvenience resulting from some loads being switched off and/or to low energy modes, but yet still requires the purchase of utility power. In such case, however, it will be appreciated that even though power is not sold back to the utility, the consumer still benefits from decreased consumption of utility power during the peak rate tariff period.

It will be understood that a wide variety of algorithms can be employed as a minimum energy usage profile depending on a particular consumer's needs and desires and the types of appliances within the network. For example, some consumers may find they can cope with virtual no power for short periods of time thus maximizing the amount of energy that can be returned to the grid for profit. Other consumers may be unable to cope with a significant reduction in household energy consumption. By employing aspects of the present disclosure, a consumer can configure the HEM to implement a desired minimum energy usage profile and only under desired conditions thereby allowing the consumer to balance value and convenience.

As will be appreciated, the low energy usage profile described herein can also be implemented manually by a consumer by selecting such mode through the HEM. This can be useful for installations where a residential generator is not in communication with the HEM but is nevertheless connected to the home circuit for supplying power thereto. In addition, manual implementation gives the consumer full control over when the profile is implemented such that the consumer is not inconvenienced by implementation of the profile.

It should further be appreciated that the low energy usage profile can be implemented at other times, such as when a consumer is on vacation or at work, or otherwise absent from the home such that any potential inconveniences can be minimized. For example, such profile could be implemented during a typical work week (Monday-Friday) during the hours of 10 am to 3 pm when the consumer is out of the house.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An energy management system for a home, comprising:
    a refrigerator;
    at least one residential power generator; and
    a home energy manager in communication with said at least one energy consuming device and said at least one residential power generator, the home energy manager device comprising a controller coupled with the refrigerator,
    wherein the controller is configured to detect when a peak demand condition corresponding to increased energy rates occurs at the same time as a period of high renewable energy availability that maximizes a total power output of the at least one residential power generator, and
    wherein, in response to both the peak demand condition and the period of high renewable energy availability, the controller is configured to operate the refrigerator in accordance with a minimum energy use profile,
    wherein the minimum energy use profile reduces a setpoint on the refrigerator to a value that reduces overall energy consumption and that prevents food spoilage, and
    wherein the minimum energy use profile instructs the controller to direct energy from the at least one residential power generator to a power grid coupled with the home.

2. A home energy management system as set forth in claim 1, wherein the controller is configured to receive a signal from a power utility supplying power to the refrigerator, the signal indicative of the peak demand condition.

3. A home energy management system as set forth in claim 1, further comprising a user input device for enabling a user to customize the minimum energy use profile.

4. A home energy management system as set forth in claim 1, wherein the controller is configured to disable the refrigerator when the minimum energy use profile is implemented.

5. A home energy management system as set forth in claim 1, wherein the controller is configured to switch the refrigerator to a low power mode when the minimum energy profile is implemented.

6. A home energy management system as set forth in claim 1, wherein the at least one residential power generator includes at least one of a gas generator, a solar cell, a wind turbine, a hydroelectric power generator, or a battery powered inverter.

7. A home energy management device comprising:
    a controller for controlling a refrigerator in accordance with a minimum energy use profile, said controller in communication with at least one residential power generator and configured to receive power output information from said at least one residential power generator; and
    a communication interface coupled with the controller, the communication interface for receiving a signal indicative of a peak demand condition corresponding to increased energy rates,
    wherein, in response to the signal indicative of a peak demand condition, the controller detects when the peak demand condition corresponding to increased energy rates occurs at the same time as a period of high renewable energy availability that maximizes a total power out output of the at least one residential power generator, and
    in response to both the peak demand condition and the period of high renewable energy availability, the controller operates the at least one energy consuming device in accordance with the minimum energy use profile,
    wherein the minimum energy use profile reduces a setpoint on the refrigerator to a value that reduces overall energy consumption and that prevents food spoilage, and
    wherein the minimum energy use profile instructs the controller to direct energy from the at least one residential power generator to a power grid coupled with the home.

8. A home energy management device as set forth in claim 7, comprising a user input device coupled with the controller, the user input device for enabling a user to customize the minimum energy use profile.

9. A home energy management device as set forth in claim 7, wherein the controller is configured to disable the refrigerator when the minimum energy use profile is implemented.

10. A home energy management device as set forth in claim 7, wherein the controller is configured to switch the refrigerator to a low power mode when the minimum energy use profile is implemented.

11. A home energy management device as set forth in claim 7, wherein the at least one residential power generator includes at least one of a gas generator, a solar cell, a wind turbine, a hydroelectric power generator, or a battery powered inverter.

12. A method of maximizing the value of power generated by a residential energy power generator and delivered to a home, the residential energy power generator connected to a home energy manager of a home energy management system, the home energy manager configured to control a refrigerator in accordance with an minimum energy use profile, the method comprising the steps of:
  detecting when a peak energy demand condition corresponding to increased energy rates occurs at the same time as a period of high renewable energy availability that maximizes a total power output of the at least one residential power generator;
  and
  in response to both the peak demand condition and the period of high renewable energy availability, operating the refrigerator in accordance with the minimum energy use profile if the power output of the generator exceeds the power rating of the minimum energy use profile,
  wherein the minimum energy use profile reduces a setpoint on the refrigerator to a value that reduces overall energy consumption and that prevents food spoilage, and
  Wherein the minimum energy use profile instructs the controller to direct energy from the at least one residential power generator to a power grid coupled with the home.

13. A method as set forth in claim 12, further comprising switching off the refrigerator.

14. A method as set forth in claim 12, wherein the step of detecting a peak energy demand includes receiving a signal indicative of the peak energy demand condition from the residential energy power generator.

15. A method as set forth in claim 12, wherein, if the power output total of the residential energy power generator decreases below the power rating of the minimum energy use profile air a prescribed period of time, operating the refrigerator in accordance with a different energy use profile.

* * * * *